US008209325B2

(12) United States Patent
Smith et al.

(10) Patent No.: US 8,209,325 B2
(45) Date of Patent: *Jun. 26, 2012

(54) SEARCH ENGINE CACHE CONTROL (75) Inventors: Benjamin T. Smith, Mountain View, CA (US); Anurag Acharya, Campbell, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/905,922

(22) Filed: Oct. 15, 2010

(65) Prior Publication Data
US 2011/0035372 A1    Feb. 10, 2011

Related U.S. Application Data (63) Continuation of application No. 10/845,283, filed on May 12, 2004, now Pat. No. 7,840,557.

(51) Int. Cl.
*G06F 7/00* (2006.01)
*G06F 17/30* (2006.01)

(52) U.S. Cl. .................................. 707/722; 707/769
(58) Field of Classification Search .................. 707/722, 707/769, 999.002
See application file for complete search history.

(56) References Cited

U.S. PATENT DOCUMENTS

| | | | |
|---|---|---|---|
| 6,457,047 B1 * | 9/2002 | Chandra et al. | 709/217 |
| 6,581,057 B1 | 6/2003 | Witbrock et al. | 705/5 |
| 6,658,533 B1 | 12/2003 | Bogin et al. | 711/135 |
| 6,826,557 B1 | 11/2004 | Carter et al. | 707/2 |
| 6,873,982 B1 | 3/2005 | Bates et al. | 707/5 |
| 7,302,425 B1 | 11/2007 | Bernstein et al. | 707/3 |
| 2001/0020248 A1 | 9/2001 | Banga et al. | 709/219 |
| 2003/0065874 A1 | 4/2003 | Marron et al. | 711/100 |
| 2004/0133538 A1 | 7/2004 | Amiri et al. | 707/1 |
| 2004/0249682 A1 | 12/2004 | DeMarcken et al. | 705/5 |
| 2004/0267712 A1 | 12/2004 | Papanyan et al. | 707/3 |
| 2005/0005237 A1 | 1/2005 | Rail et al. | 715/530 |
| 2005/0044064 A1 | 2/2005 | Haase | 707/3 |
| 2005/0086216 A1 | 4/2005 | Davis | 707/3 |
| 2005/0198076 A1 | 9/2005 | Stata et al. | 707/200 |
| 2006/0167864 A1 | 7/2006 | Bailey et al. | 707/3 |

OTHER PUBLICATIONS

Sullivan, D., "Inkomi Reenters Battle for Biggest," www.searchenginewatch.com, Jun. 2, 2002.

\* cited by examiner

*Primary Examiner* — Kimberly Wilson
(74) *Attorney, Agent, or Firm* — Morgan, Lewis & Bockius LLP (57) ABSTRACT

A search query containing one or more terms is received from a client system. In response to receiving the search query, one or more snippets obtained in response to a prior execution of said search query are requested from a cache. For a respective snippet received from the cache, it is determined whether the respective snippet is a current version. In response to a determination that the respective snippet is not the current version, the current version of the respective snippet is obtained from a corresponding document in which one or more terms from said search query are located and the snippet stored in the cache is updated using the obtained current version. Search query results including the respective snippet are transmitted to the client.

31 Claims, 11 Drawing Sheets

SEARCH ENGINE CACHE CONTROL

RELATED APPLICATIONS

This application is a continuation of and claims priority to U.S. patent application Ser. No. 10/845,283, filed May 12, 2004 entitled "Search Engine Cache Control," now U.S. Pat. No. 7,840,557, which is incorporated herein by reference in its entirety.

FIELD OF THE INVENTION

The present invention relates to search engines, such as Internet and intranet search engines, and in particular the present invention relates to search engine cache control.

BACKGROUND

Most people searching the World Wide Web (WWW) use search engines that are designed to help locate information stored on Web sites. Most, if not all, search engines search the WWW for one or more words, phrases, and/or combinations of words or phrases (hereinafter "term" or "terms"), keep an index of the located terms and where they were located, and allow users to look for terms in the index.

To index the billions of Web pages that exist on the WWW, a search engine's "web crawler" locates and downloads Web pages, graphics, audio, video, or other data files (hereinafter "documents"). The search engine's indexing modules or engines then process the downloaded documents, creating an index of terms found in those documents, such as terms on a Web page, the name of the located document itself, or the path where the document is located. In some embodiments, the indexing modules may ignore insignificant terms and may include in the index information about where in the document each indexed term is located.

The index created by the search engine is especially used to identify documents that contain search terms. To search for documents on a particular subject, a user enters or otherwise specifies a search query containing a term and submits the search query to the search engine. The search engine then searches its index to identify documents that contain the term specified by the search query. If the index contains a very large number of documents that satisfy the search query, for example, more than a thousand documents, the search engine may utilize various mechanisms to truncate the search or to otherwise limit the number of documents identified by the search. In any case, each document located by the search engine in response to the search result (excluding those documents which satisfy the query but are not included in the search results) is given a rank or score, otherwise know as the "query rank," based on the perceived relevance of the document query. A search result listing the located documents, ordered by query rank, is then presented to the user. In other words, the documents with the best (e.g., highest) query ranks are presented first in the search result listing, followed by documents having lower query ranks. In addition, it should be understood that the search result listing generally includes a listing of documents that satisfy the search query, not the documents themselves. The search query listing will typically include for each listed document a title or other identifying information extracted from the document, a link (sometimes called a hyperlink or anchor tag) to the document, and a "snippet" of text to help the user decide whether to view the document. A snippet is a portion of text from a document that contains the search term. For example, " . . . Computer-Flagship magazine of the IEEE Computer Society, where computing practitioners, . . . " contains the search term "IEEE."

Furthermore, as the WWW expands and the universe of documents grows, so does the size of the index. A large index generally takes longer to search than a smaller index. Accordingly, a system and method that increases search efficiency, while returning the most currently indexed search results within an acceptable time period would be highly desirable.

SUMMARY

In a method of searching a document database, a version number or datestamp is associated with each document in a list of documents or document index. A search query containing at least one term is received at a search controller from a query server and preferably normalized and hashed into a representation of the search query. The representation of the search query is transmitted towards a cache containing multiple query result entries. Each query result entry contains a list of documents associated with the previously searched search query. The cache is then searched and query result entries for the search query are sent to the search controller from the cache. Subsequently, it is determined whether the query result entries are current versions for the search query. If the query result entries are not the current versions, then current versions of the query result entries are obtained.

Snippet entries are then requested from the cache corresponding to the query result entries obtained from the cache. Once the snippet entries are received from the cache, it is determined whether the snippet entries are current for the search query. If the snippet entries are not current, the current snippet entries are obtained from documents in which terms from the search query are located. If the snippet entries are current, then duplicate snippets are removed, the remainder of the snippets are sorted and sent to the query server for onward transmittal to the user that submitted the search query.

In another aspect of the invention there is provided a system for searching a document database. The system may include a query server, a cache, a search controller, a document index, and a document database. The cache preferably contains multiple query result entries. Each query result entry contains a list of document identifiers or URLs associated with a previously searched search query. The search controller preferably includes a version table identifying current versions of indexed documents. The search controller also preferably includes communication procedures for receiving a search query containing at least one term, transmitting a representation of the search query towards the cache, and receiving at least one query result entry for the search query from the cache. In addition, the search controller preferably includes instructions for determining whether the at least one query result entry is a current version for the search query, and instructions for obtaining the current version of the at least one query result entry, if the at least one query result entry is not the current version.

Accordingly, search efficiency is improved by searching a cache of previous search results before searching the entire document index, while ensuring that the most currently indexed search results are returned to a user.

BRIEF DESCRIPTION OF THE DRAWINGS

For a better understanding of the nature and objects of the invention, reference should be made to the following detailed description, taken in conjunction with the accompanying drawings, in which.

Like reference numerals refer to corresponding elements, components or steps throughout the several views of the drawings.

DESCRIPTION OF EMBODIMENTS

The efficiency and cost of performing a search is dependent on a number of factors, such as the various combinations of keywords used in the search, the length of time spent on the search, the number of documents indexed, etc. The average response time and cost of a search is lowered by storing the search results of previously requested search queries in a temporary storage or cache of a search engine system. One of the benefits of keeping a cache of commonly searched information is that it ensures a fast response to subsequent search queries for the same information, as it takes less time to retrieve the information from local memory. Another benefit of caching commonly searched information is to reduce the cost of servicing multiple search queries requesting the same information. When the result of a search query is cached, there is no need to perform another search of the document index, which may be distributed over multiple disks and memory arrays on multiple remote computer servers. Retrieving such information from the multiple disks and memory arrays in multiple remote computer servers requires significantly more time and resources than retrieving the information from the cache. Accordingly, the systems and methods described below increase search efficiency by using a cache and returning the most recently indexed search results.

Figure 1:
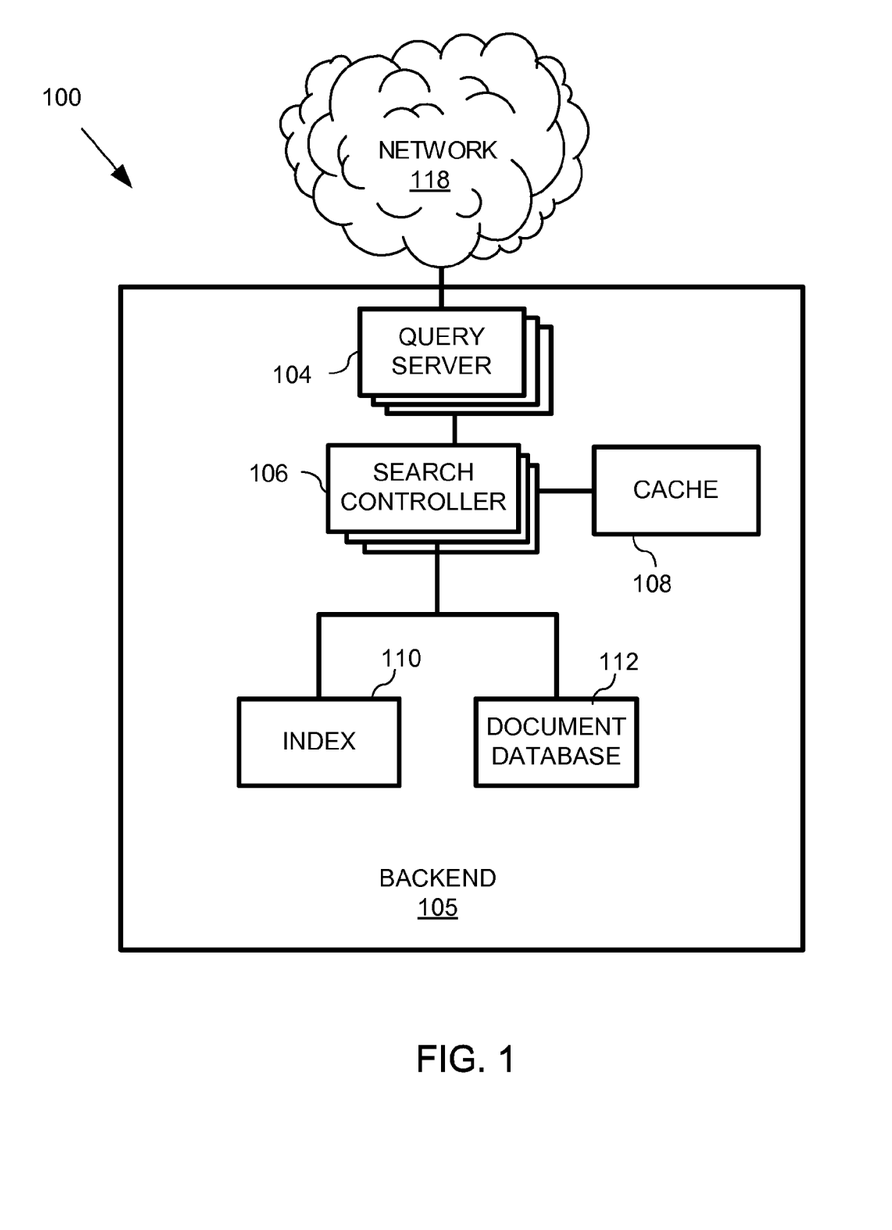
FIG. 1 is a block diagram of a search engine system, according to an embodiment of the invention.

FIG. 1 illustrates an embodiment of a search engine system 100. It should be appreciated that the layout of the search engine system 100 is merely exemplary and may take on any other suitable layout or configuration. The search engine system 100 is used to search an index of documents, such as billions of Web pages or other documents indexed by modern search engines.

Note that the search engine system 100 can be used as an Internet search engine, for locating documents on the World Wide Web, or as an Intranet search engine, for locating documents stored on servers or other hosts within an Intranet. In addition, the methodology described herein is applicable to implementations where only portions of documents, such as titles and abstracts, are stored in the database of the search engine system.

The search engine system 100 includes multiple datacenters each housing a backend 105. The datacenters are generally widely dispersed from one another, such as across the continental United States. Search queries submitted by users to the search engine system are routed to an appropriate backend 105 as part of the Domain Name System (DNS), based on current load, geographic locality, whether that datacenter is operating, etc.

Each backend 105 preferably includes multiple query servers 104 coupled to a network 118. The network 118 is preferably the Internet, but may also be any local area network (LAN), wide area network (WAN), or the like. In a preferred embodiment, each query server 104 is a Web server that receives search requests and delivers search results in the form of web pages via HTTP, XML, or similar protocols. Alternatively, if a query server 104 is used within a LAN, i.e., internally and not by the public, it may be an intranet server. In essence, the query servers 104 are configured to control the search process, including searching a document index, analyzing and formatting the search results, etc.

Each backend 105 also preferably includes multiple search controllers 106 coupled to the multiple query servers 104. Each of the search controllers 106 is also preferably coupled to a cache 108, a document index 110 and a document database 112. Each search controller 106 is configured to receive requests from a query server 104 and transmit the requests to the cache 108, the document index 110, and the document database 112. The cache 108 is used to increase search efficiency by temporarily storing previously located search results.

Filtering the search results may occur at any level in the system 100. For example, the search controller 106 may be configured to remove any duplicate entries from the search results received from the index 110, and to collate these lists into a single list of search results. In some embodiments, a query rank is computed by the index 110 for each document identified as satisfying the search query, excluding any documents not included in the search results due to search truncation. The query rank values for the documents in the search results are conveyed to the search controller 106 and/or query server 104, and are used to construct an ordered search result list. Once the search controller 106 constructs the ordered search result list, the search controller 106 transmits the result list to the query server 104, which transmits to the document database 112 a request for snippets of an appropriate subset of the documents in the ordered search list. For instance, the search controller 106 may request snippets for the first fifteen or so of the documents in the ordered search result list. The document database 112 constructs snippets based on the search query, and returns the snippets to the search controller 106. The search controller 106 then returns a list of located documents and snippets back to the query server 104 for onward transmittal to the party requesting the search. Further details of this method are described below in relation to FIGS. 7A-7E.

The index 110 preferably contains an index or database that maps a term to corresponding document identifiers. For example, the index 110 may include an index or database containing a search term "IEEE" and a list of documents, identified by document identifier or URL, in which the term "IEEE" appears. In some embodiments, the index 110 is implemented using a plurality of computers, while in another the index 110 is implemented using a single computer.

The document database 112 stores the documents themselves. Each stored document is indexed by a document identifier. The snippets included in the search results returned by the search engine to a user are obtained from the corresponding documents in the document database 112.

Figure 2:
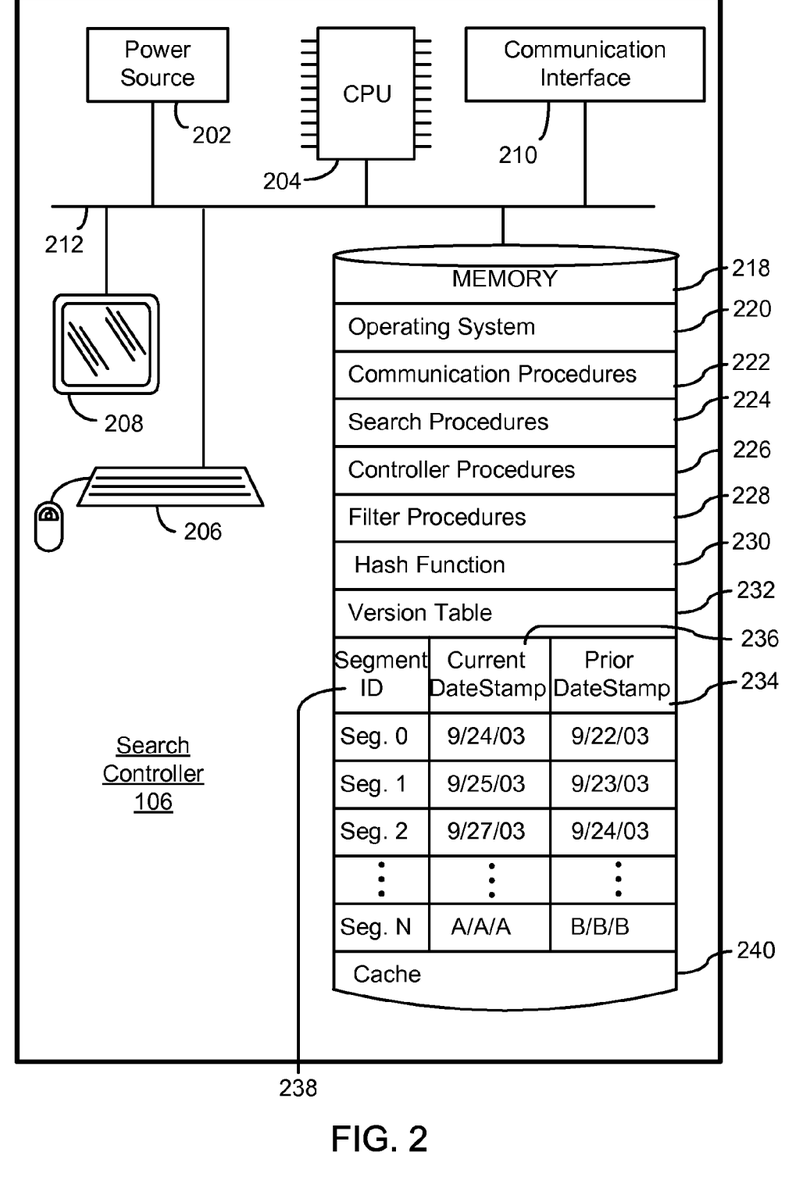
FIG. 2 is a block diagram of the search controller shown in FIG. 1.

FIG. 2 is a block diagram of one of the search controllers 106 shown in FIG. 1. The search controller 106 preferably includes: at least one data processor or central processing unit (CPU) 204; memory 218; a communication interface 210 for communicating with the query server 104 (FIG. 1), cache 108 (FIG. 1), index 110 (FIG. 1), and document database 112 (FIG. 1); a power source 202 configured to be coupled to a source of power; and at least one bus 212 that interconnects these components. The search controller 106 may also optionally include one or more user interface devices, such as a monitor 208, and a keyboard/mouse 206.

Memory 218 preferably includes high-speed random access memory and may include non-volatile memory, such as one or more magnetic disk storage devices. Memory 218 preferably stores an operating system 220, such as LINUX, UNIX or WINDOWS, that includes procedures for handling basic system services and for performing hardware dependent tasks. Memory 218 also preferably stores communication procedures 222 used for communicating with the query server 104 (FIG. 1), cache 108 (FIG. 1), index 110 (FIG. 1), and document database 112 (FIG. 1). In particular, the communication procedures 222 are used for receiving search requests from the query server 104 (FIG. 1); transmitting the requests to the cache 108 (FIG. 1) and the index 110 (FIG. 1); receiving lists of search results from the cache 108 or the index 110 (FIG. 1); transmitting lists of search results to the query server 104 (FIG. 1); receiving a request for snippets from the query server; transmitting the request for snippets to the cache or document database 112 (FIG. 1); receiving snippets back from the cache or document database 112 (FIG. 1); and returning the search results, including a list of located documents and snippets, back to the query server 104 (FIG. 1) for onward transmittal to the user device from where the search request was received, as described below in relation to FIGS. 7A-7E.

Memory 218 also preferably includes: search procedures 224 for performing searches of the cache 108 (FIG. 1), index 110 (FIG. 1), and document database 112 (FIG. 1); controller procedures 226 for merging, truncating, removing duplicates, etc.; filter procedures 228 for filtering search results; a hash function 230 that converts a search query into a fixed-sized output or hash value; a version table 232; and a cache 240 for temporarily storing data.

The version table 232 preferably contains a table or array of fields, including segment identifier fields 238, a current version or current datestamp 236 for each segment identifier, and a prior version or prior datestamp 234 for each segment identifier. The segment identifier identifies the portion or segment of all documents that have been indexed or crawled. For example, segment zero (Seg. 0) identifies the first ten thousand documents that have been indexed. The current datestamp indicates the time and/or date when a particular segment was last indexed. For example, segment zero was last indexed or crawled on Sep. 24, 2003. The prior datestamp indicates the second most recent time and/or date when a particular segment was indexed. For example, the previous time that segment zero was indexed or crawled before Sep. 24, 2003, was Sep. 22, 2003.

Figure 3:
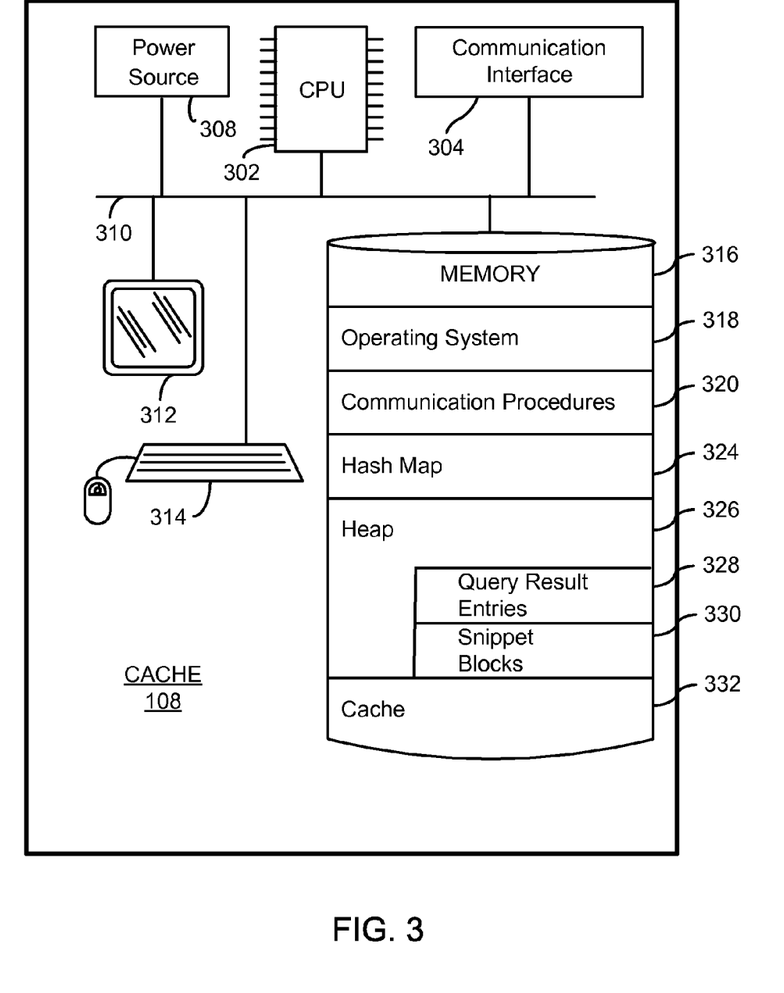
FIG. 3 is a block diagram of the cache shown in FIG. 1.

FIG. 3 is a block diagram of the cache 108 shown in FIG. 1. The cache 108 preferably includes: at least one data processor or central processing unit (CPU) 302; memory 316; a communication interface 304 for communicating with the search controllers 106 (FIG. 1); a power source 308 configured to be coupled to a source of power; and at least one bus 310 that interconnects these components. The cache 108 may also optionally include one or more user interface devices, such as a monitor 312, and a keyboard/mouse 314.

The cache 108 preferably includes high-speed random access memory and may include non-volatile memory, such as one or more magnetic disk storage devices. Memory 316 preferably stores an operating system 318, such as LINUX, UNIX or WINDOWS, that includes procedures for handling basic system services and for performing hardware dependent tasks. Memory 316 also preferably stores communication procedures 320 used for communicating with the search controller 106 (FIG. 1). In particular, the communication procedures 320 are used for receiving search requests from the search controller 106 (FIG. 1); transmitting results back to the search controller 106 (FIG. 1); receiving requests for snippets from the search controller; and returning snippets back to the search controller, as described below in relation to FIGS. 7A-7E.

Memory 316 also preferably includes: a hash map 324 for mapping the hash value produced by hash function 230 (FIG. 2) to the indexed query result entries; a heap 326 of memory that is dynamically allocated and de-allocated on demand; and a local cache 332 for temporarily storing data.

The heap 326 preferably contains query result entries 328 and snippet blocks 330, as described in further detail below in relation to FIGS. 5 and 6.

Figure 4:
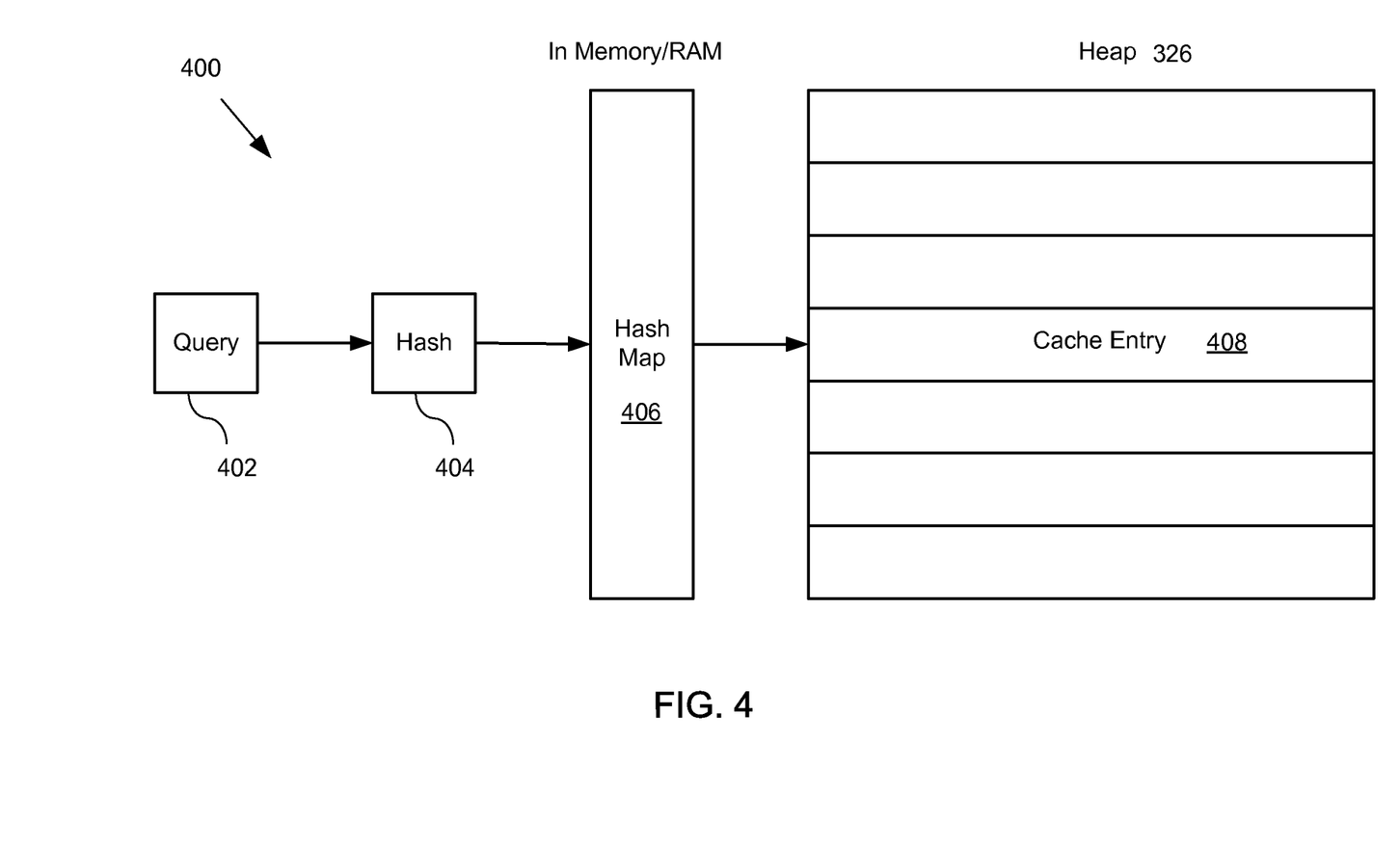
FIG. 4 is a schematic representation of a search query being mapped into the cache, according to an embodiment of the invention.

FIG. 4 is a schematic representation 400 of a search query 402 being mapped into the cache 108 (FIG. 1). Once the search query 402 is received by the cache 108 (FIG. 1), the search query is hashed 404. The hashed search query is then compared to the hash map 406 to locate the relevant cache entry 408 in the heap 326. It should, however, be appreciated that the hash function and hash map lookup may alternatively occur at the search controller.

Figure 5:
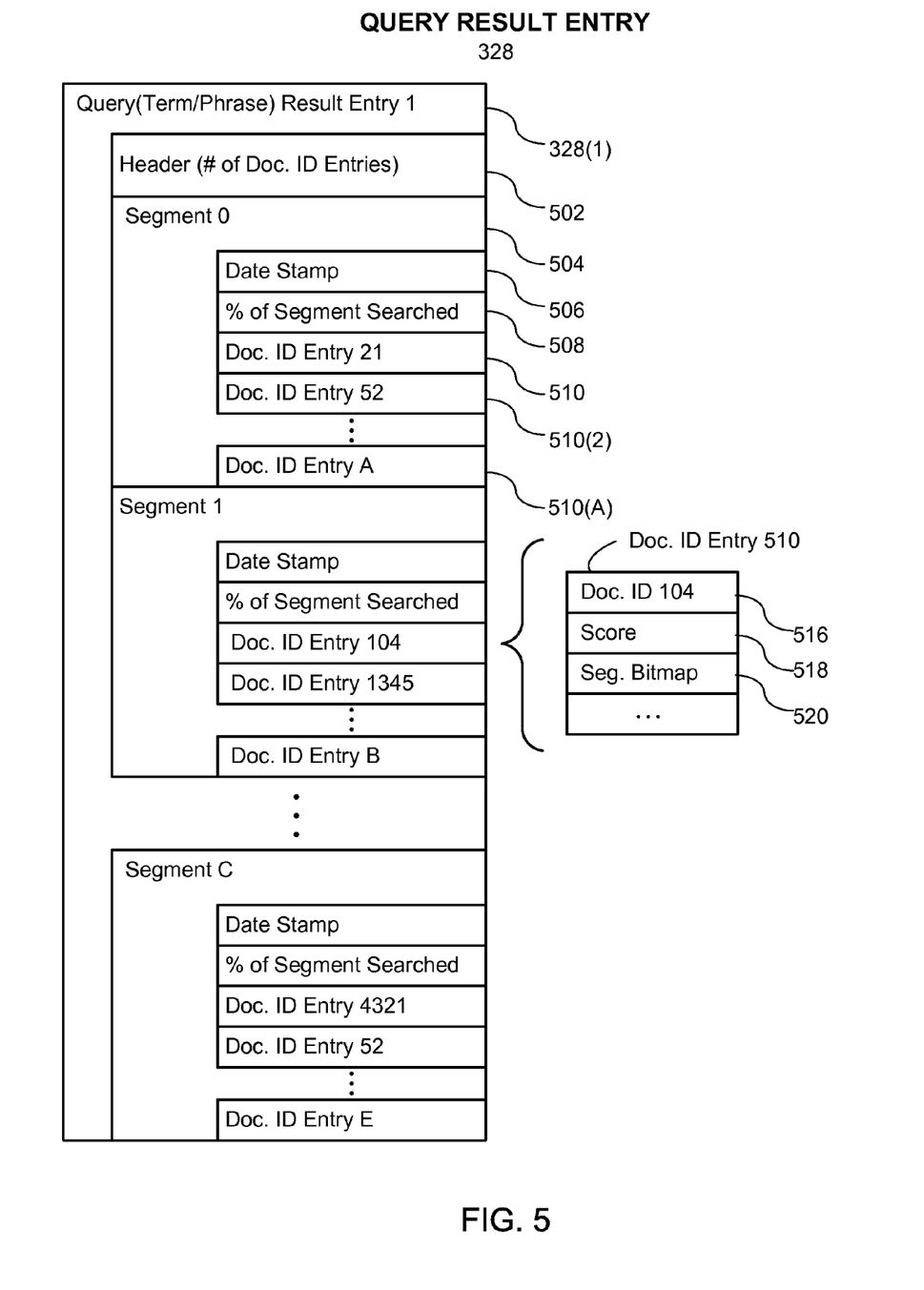
FIG. 5 is a block diagram of a query result entry stored in the cache shown in FIG. 3.

FIG. 5 is a block diagram of a query result entry 328 stored in the cache 108 (FIG. 1). Each query result entry 328 is specific to a particular search term or phrase, such as "IEEE." The search query result entry 328(1) preferably contains a header 502 that includes information such as the overall number of documents identifiers (Doc. IDs) listed for the particular query result entry 328(1). For example, one thousand documents may contain the search term "IEEE." Each query result entry 328 is preferably divided by segment 504. For example, query result entry 1 may contain documents in segments 0, 1, and C, i.e., documents in the first 10000, second 10000, and Cth 10000 indexed documents. Each segment 504 preferably contains: a datestamp 506 indicating when the segment containing the list of document stored in the cache was last indexed or crawled, such as on Sep. 24, 2003; the percentage of that segment which was searched 508, such as 95% of the segment was searched and indexed; and a list of the document ID entries (Doc. ID Entries) 510 (1)-(A) for documents in that segment that contain the particular search term.

Each document ID entry 510 preferably contains a document identifier (Doc. ID) 516, a rank or score 518 for that document, a bitmap representing the segment in which the document can be located (Seg. Bitmap) 520, as well as other information. The score 518 is preferably a search dependent score or query rank.

Figure 6:
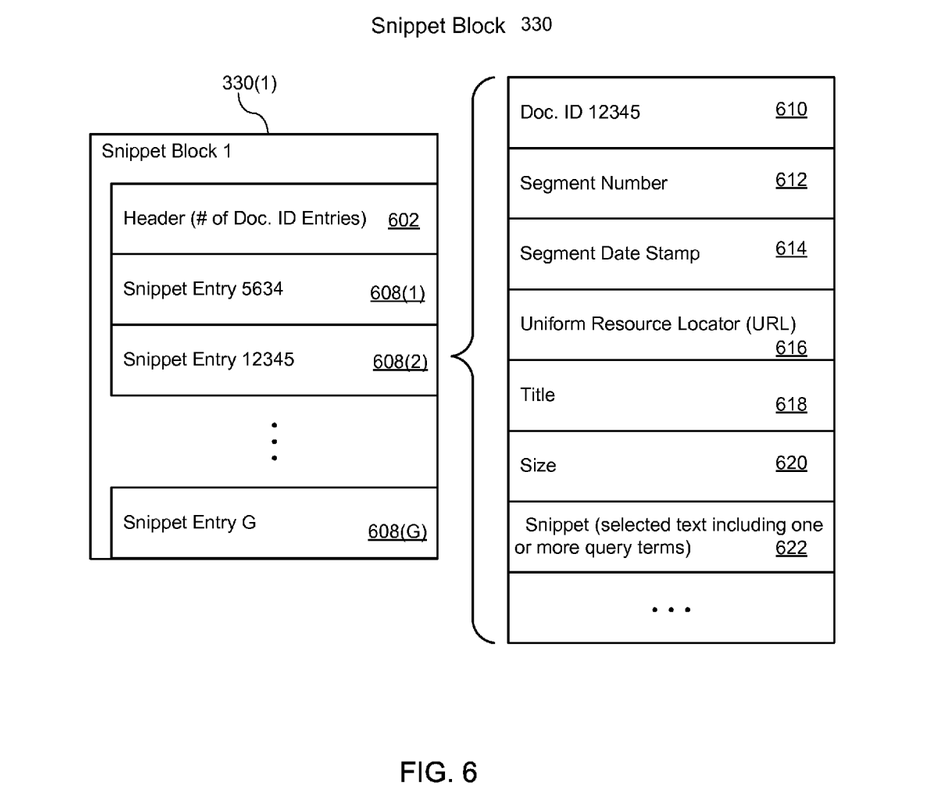
FIG. 6 is a block diagram of a snippet block stored in the cache shown in FIG. 3.

FIG. 6 is a block diagram of a snippet block 330 (FIG. 3) stored in the cache 108 (FIG. 1). The snippet block 330(1) preferably contains a header indicating the number of document ID entries (Doc. ID Entries) 602 in the snippet block. The snippet block 330(1) also preferably contains snippet entries 608(1)-(G). Each snippet entry 608 preferably contains a document identifier (Doc. ID) 610, a Segment Number 612 in which that document is located; a segment datestamp 614 indicating when the segment was indexed or crawled; a uniform resource locator (URL) 616 for the document; a title 618 for the document; a size 620 of the document; a snippet 622; as well as other information.

FIGS. 7A-7E are flow charts of a method 700 for performing a search. As the WWW changes continually with documents being added, removed, edited, etc., the documents are preferably re-indexed as often as possible to keep the index current. Newly created indexes are then stored in the in the index 110 (FIG. 1). As each segment of the documents are indexed, a datestamp of when the indexing occurred is sent from the index 110 (FIG. 1) to the search controller 106 (FIG. 1). The search controller receives these datestamps, at step 704, and stores them in the version table 232 (FIG. 2) as the current datestamp 236 (FIG. 2) for each segment identifier 238 (FIG. 2). The datestamp that was previously the current datestamp is stored, at step 706, as the prior datestamp 234 (FIG. 2). This allows the search controller to respond to a search query with search results that are not the most current, if the system is stressed, such as where too many requests are being received or the index or document database are inoperative.

Initially, a user submits a search query to the system 100 (FIG. 1). The search query is received at a particular backend 105 (FIG. 1) (based on DNS data) and the search request is transmitted to one of the several query servers 104 (FIG. 1) in that datacenter based on a load balancing algorithm. The query server 104 (FIG. 1) receives the search request and transmits the search query to one of the search controllers 106 (FIG. 1), at step 708. The search controller 106 (FIG. 1) receives the search query at step 710, normalizes the query and applies the hash function 230 (FIG. 2) to the normalized query to produce a hash value at step 712. The communication procedures 222 (FIG. 2) then transmit the hash value representing the normalized search query to the cache at step 714. The communication procedures 320 (FIG. 3) in the cache receive the search query hash value at step 716. Alternatively, the query normalization and hashing functions may be performed by the cache.

The hash map 324 (FIG. 3) is then searched for an entry equal to the hash value at step 718. If a matching hash entry is found in the hash map, that entry identifies an entry in the cache that corresponds to the search query (step 720), and that cache entry is retrieved at step 722 so as to obtain a list of document ID entries (Doc. ID), which are then transmitted back to the search controller at step 724. The list of document ID entries is preferably transmitted per segment 504 (FIG. 5). If no results are located, nothing (other than a negative reply) is sent to the search controller, which will proceed to search the index 110 (FIG. 1) in the same manner as if the result list entries were not recent, i.e., step 730—No.

Figure 7A:
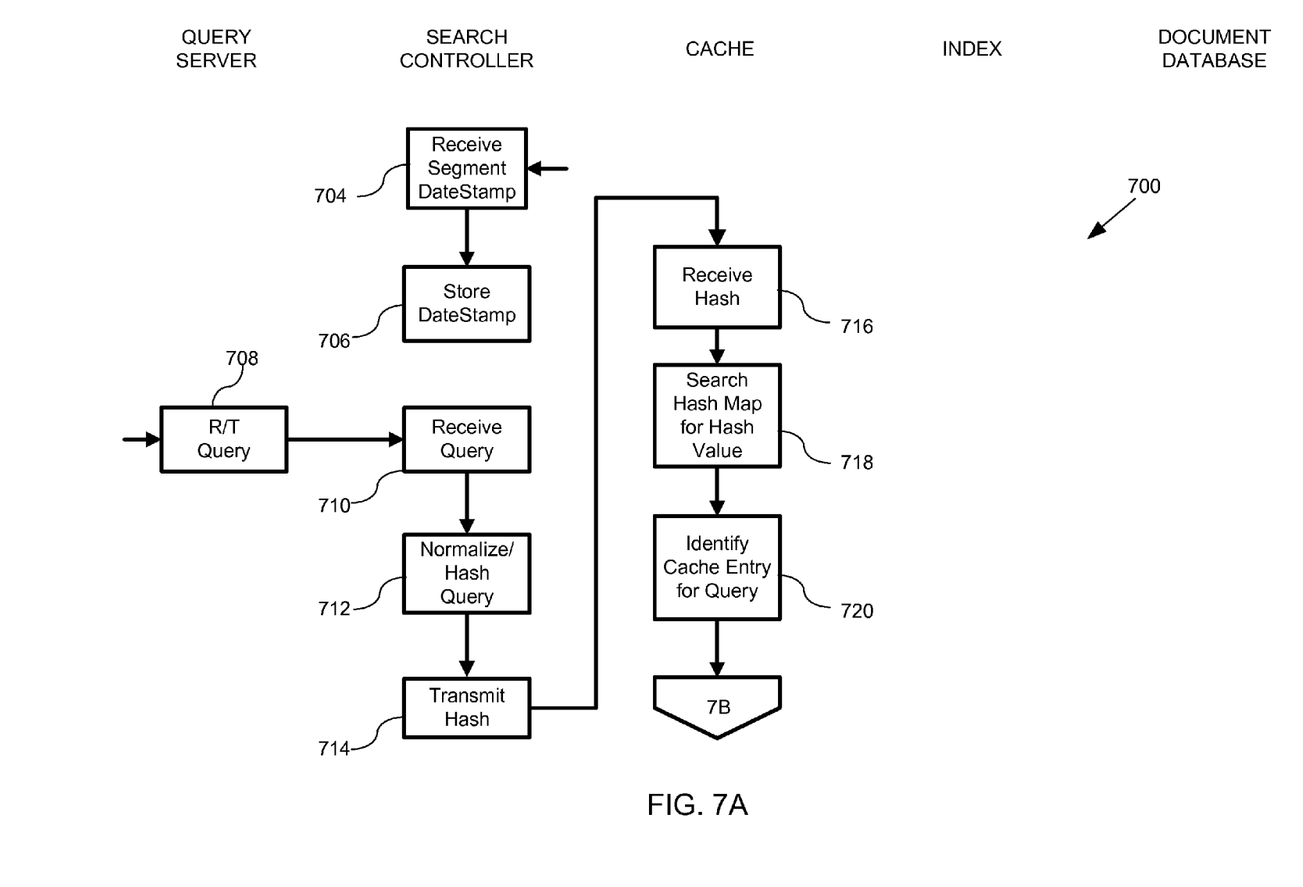
FIGS. 7A-7E are flow charts of a method for performing a search, according to an embodiment of the invention.
Figure 7B:
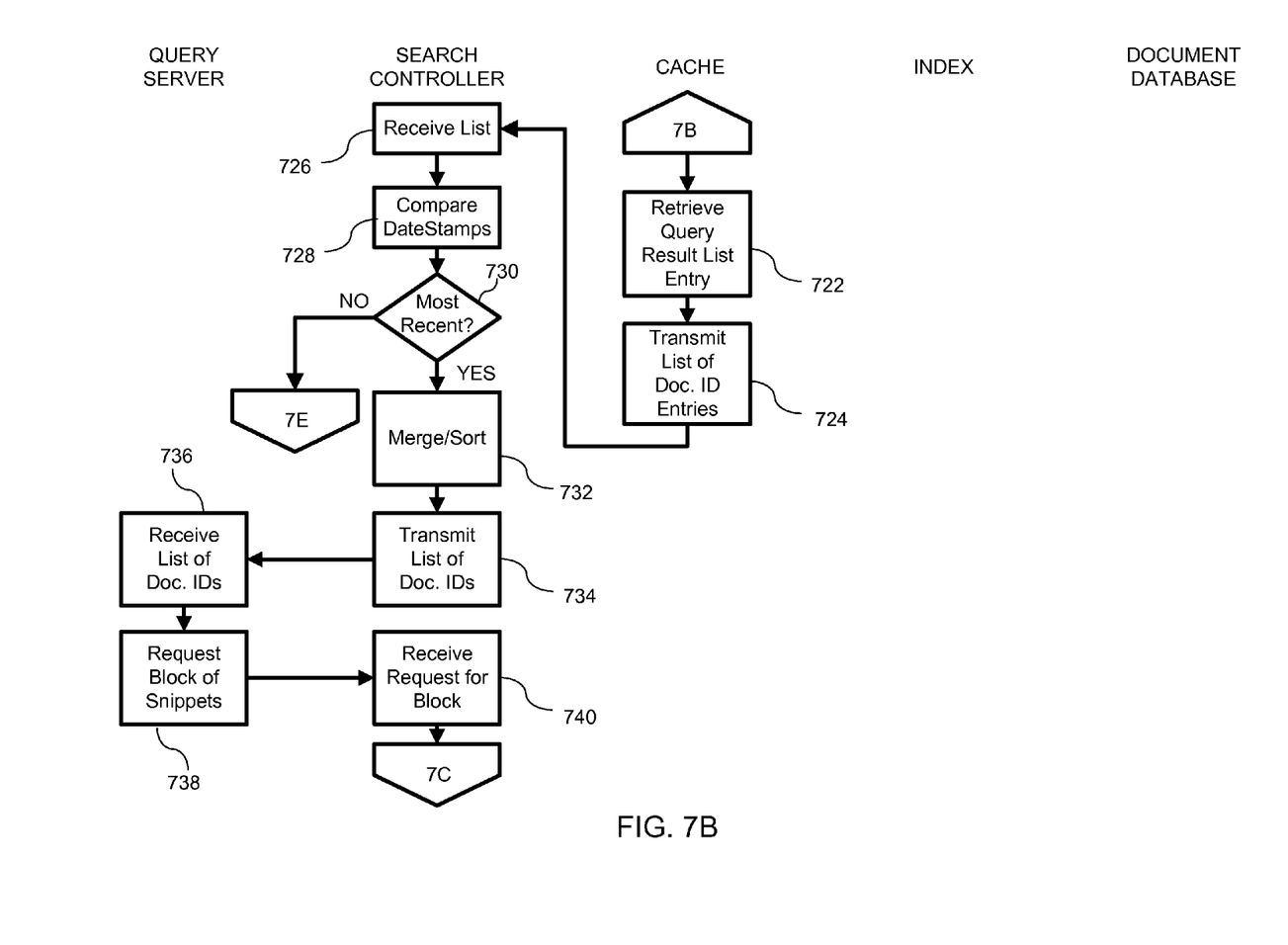
Figure 7C:
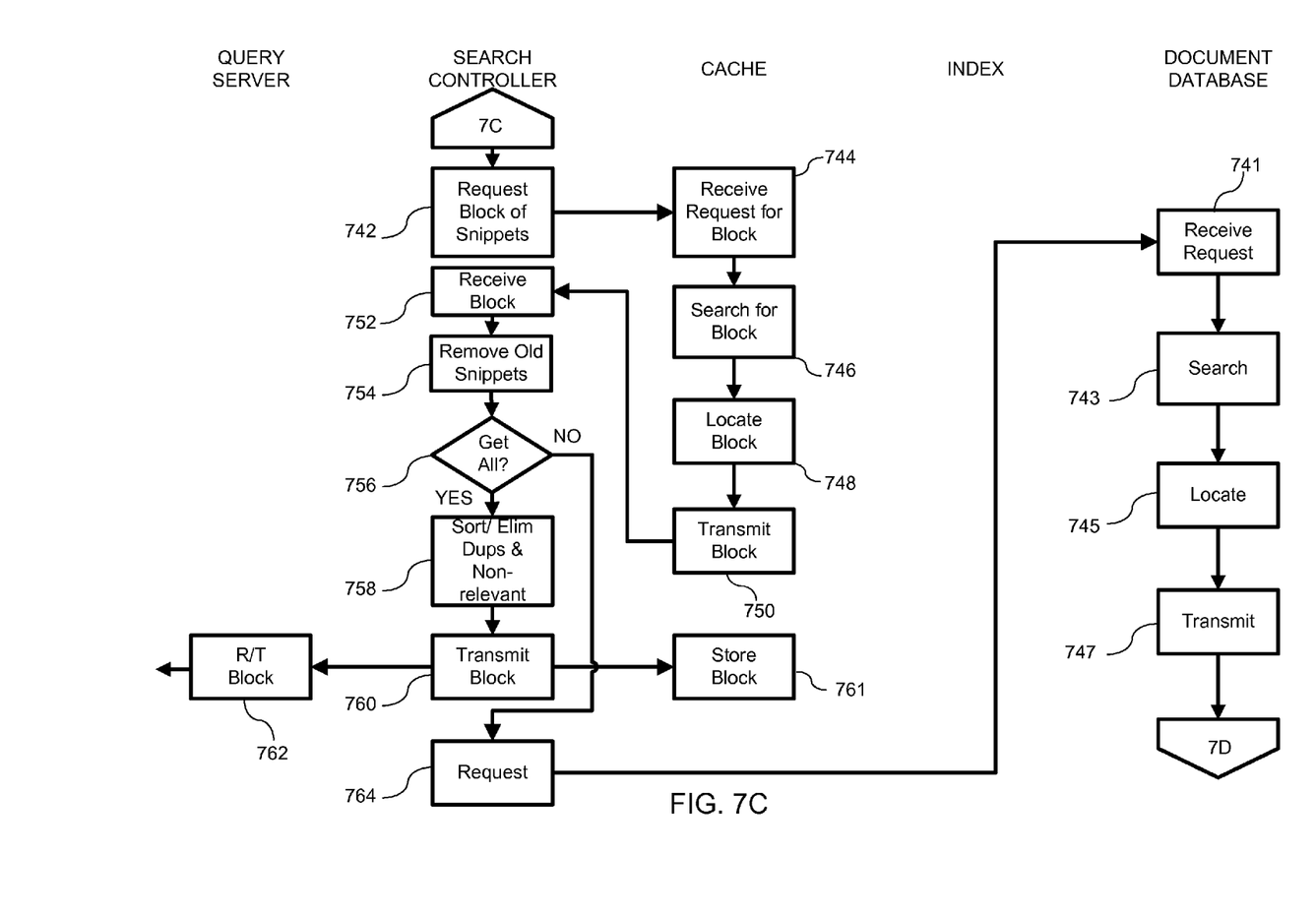
Figure 7D:
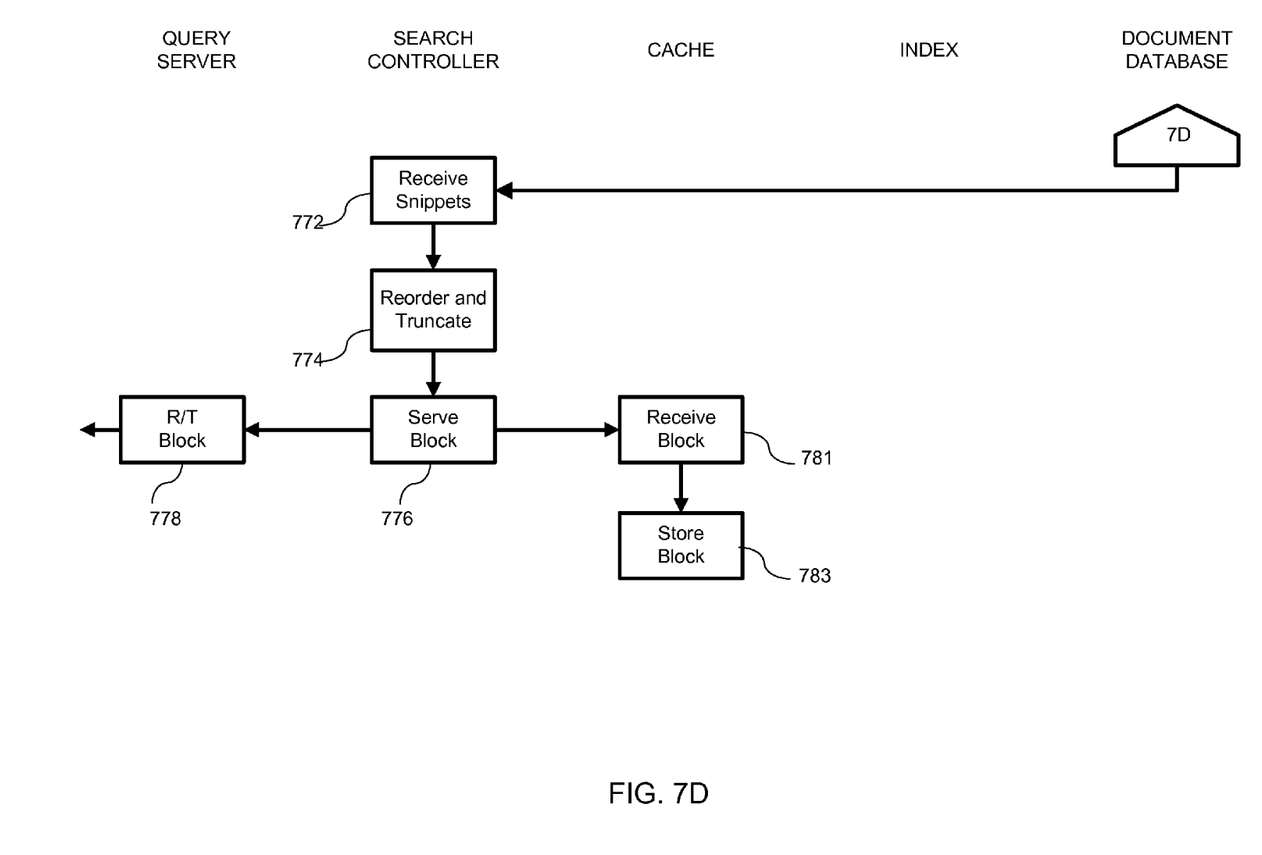
Figure 7E:
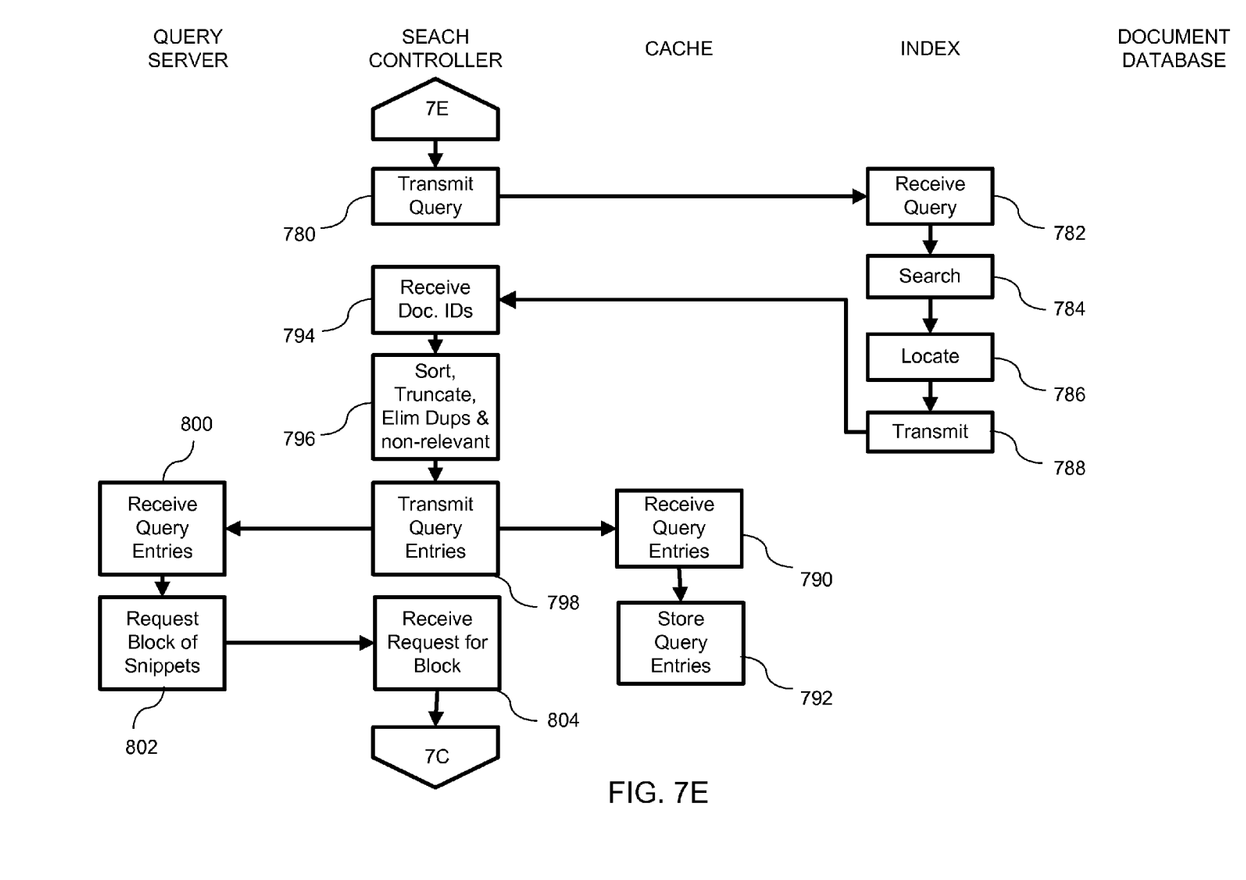

The list of document ID entries are then received by the search controller at step 726. As explained above in relation to FIG. 5, each document ID entry 510 (FIG. 5) preferably contains at least a document identifier (Doc. ID) 516 (FIG. 5) and a bitmap 520 (FIG. 5) of the segment in which the document is located. The search procedures 224 (FIG. 2) in the search controller then compares the segment bitmap 520 (FIG. 5) of each document ID entry 510 (FIG. 5) with the current datestamp 236 (FIG. 2) for that segment number 238 (FIG. 2) at step 728. For example, the segment bitmap may indicate that the Doc. ID Entry 510 (FIG. 5) has a datestamp of Sep. 21, 2003, whereas the current datestamp for segment 1 is Sep. 25, 2003, thereby indicating that Doc. ID Entry 510 (FIG. 5) is not current. Based on the comparison performed at step 728, the search procedures 224 (FIG. 2) determine if the document ID entry is the most recent or current document ID entry at step 730. If the document ID entry is not the most current (730-N), then the search query is transmitted toward the index 110 (FIG. 1) at step 780 (FIG. 7E).

The search query is received by the index 110 (FIG. 1) at step 782. The index is then searched at step 784 and document identifiers located at step 786. A list of located document identifiers corresponding to documents that contain the search term are transmitted back to the search controller at step 788. It should be appreciated that the results preferably contain a list of document identifiers (Doc. IDs), or an indication that no results were located in the index 110 (FIG. 1).

The list of document identifiers is received by the search controller at step 794. The controller procedures 226 (FIG. 2) and filter procedures 228 (FIG. 2) on the search controller then: sorts the list of document identifiers; truncates the list to only include a predetermined amount of document identifiers, such as the top 1000 documents; eliminates duplicates from the list; and/or removes non-relevant document identifiers at step 796.

The search controller then transmits the list of query result entries toward the query server and the cache at step 798. The query result entries are received by the cache at step 790, which stores the list of query result entries at step 792. Similarly, the query server receives the list of query result entries, at step 800, and sends a request for a block of snippets corresponding to the list of document identifiers back to the search controller at step 802. The request for snippets is received by the search controller at step 804, which in turn requests the block of snippets from the cache at step 742 (FIG. 7C). The cache receives the request for the block of snippets at step 744 and searches the heap 326 (FIG. 2) for the requested snippet block 330 (FIG. 3) at step 746. If the block of snippets is located, at step 748, the block is transmitted to the search controller at step 750. If the block of snippets is not located, nothing is sent to the search controller, which proceeds as if not all the snippets were located, i.e., step 756—No.

The block of snippets is then received by the search controller at step 752. The controller procedures 226 (FIG. 2) and filter procedures 228 (FIG. 2) on the search controller then remove any old snippets at step 754. This is accomplished by: comparing the segment datestamp 614 (FIG. 6) for each snippet entry 608 (FIG. 6) against the current datestamp 236 (FIG. 2) for that segment; and then removing snippet entries that are not current. The search procedures 224 (FIG. 2) then determine whether all current snippets have been received at step 756. If all current snippets have been received from the cache (756—Yes), then the snippet entries are sorted and/or any duplicates and non-relevant snippet entries eliminated at step 758. The block of snippet entries is then transmitted to both the query server and cache, at step 760. The query server receives the block of snippet entries and sends them toward the user that made the search request, at step 762. Similarly, the cache receives the block of sorted snippets and stores them for later use at step 761.

If all current snippets have not been received from the cache (756—No), then the search controller requests, at step 764, the current snippets from the document database 112 (FIG. 1), which receives the request as step 741. The document database then searches, at step 743, for the current snippets. If the current snippets are located, at step 745, they are transmitted toward the search controller at step 747.

The current snippets are received by the search controller at step 772. The controller procedures 226 (FIG. 2) and filter procedures 228 (FIG. 2) on the search controller then reorder or sort the current snippets into a block of snippets and/or truncates the block, if necessary, at step 774. The search controller then serves the block of snippets to the query server and the cache at step 776. The query server receives the block of snippets, which are transmitted toward the user device from where the search request came, at step 778. Similarly, the cache receives the block of snippets, at step 781, and stores the block for later use at step 783.

Returning to FIG. 7B, if the search controller received the most current document identifiers (730—Yes), then the document identifiers are merged into a list that is preferably sorted, at step 732. The list of document identifiers are then transmitted, at step 734, toward the query server, which receives them, at step 736, and requests one or more blocks of snippets corresponding to the list of document identifiers to the search controller at step 738. The search controller receives the request for the block of snippets at step 740 and requests the block of snippets from the cache at step 742. The method continues with the cache receiving the request for the block of snippets, at step 744, etc., as described above.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for searching a document database, comprising:
    at a server system including one or more processors and memory storing one or more programs, the one or more processors executing the one or more programs to perform the operations of:
    receiving a search query from a client system, the search query containing one or more terms; and
    in response to receiving the search query:
        generating a list of document identifiers including document identifiers for one or more documents identified in response to a prior execution of the search query;
        accessing a cache;
        receiving, from the cache, a first set of snippets for a first set of document identifiers, the first set of document identifiers comprising document identifiers in the list for which the cache has current snippets, as determined in accordance with datestamps of the first set of snippets stored in the cache, wherein the retrieved first set of snippets comprise snippets obtained in response to a prior execution of the search query;
        generating a second set of snippets for a second set of document identifiers, the second set of document identifiers comprising document identifiers in the list for which the cache does not have current snippets; and
        transmitting, to the client system, search query results comprising information corresponding to at least a portion of the list of document identifiers and corresponding snippets, each corresponding snippet comprising a snippet from the first set of snippets or the second set of snippets.

2. The method of claim 1, wherein a corresponding snippet for a document is a portion of text from the corresponding document that is selected so as to include at least one of the one or more terms in the search query.

3. The method of claim 1, wherein the first set of snippets and the second set of snippets correspond to snippets for a subset of the one or more documents.

4. The method of claim 1, wherein the datestamps of the first set of snippets indicate when corresponding documents from which the first set of snippets were obtained were indexed or crawled.

5. The method of claim 1, wherein generating a second set of snippets includes updating at least one non-current snippet in the cache with a corresponding snippet in the second set of snippets.

6. The method of claim 5, wherein each of the one or more documents is stored in a respective segment of a document database having multiple segments and wherein generating the second set of snippets includes generating a current snippet from a current version of a corresponding document, the current version identified based on a current datestamp for the corresponding document, wherein the current datestamp corresponds to a date on which the respective segment of the document database was last indexed or crawled.

7. The method of claim 5, wherein the at least one non-current snippet is stored in the cache in a block of snippets; and updating the at least one non-current snippet stored in the cache includes updating the block of snippets stored in the cache.

8. The method of claim 1, wherein generating the second set of snippets includes removing one or more corresponding non-current snippets from the cache.

9. The method of claim 1, further comprising:
    requesting a block of snippets from the cache; and
    receiving the block of snippets from the cache.

10. The method of claim 9, further comprising determining whether the block of snippets has been received from the cache.

11. The method of claim 10, further comprising:
    requesting the block of snippets from a document database containing documents having terms from the search query therein; and
    receiving the block of snippets.

12. The method of claim 9, wherein the transmitting includes transmitting the block of snippets to the client system, and the method further comprises, prior to transmitting the plurality of snippets to the client system:
    sorting the block of snippets; and
    eliminating any duplicate and non-relevant snippets from the received block of snippets.

13. The method of claim 1, further comprising, after receiving the search query, normalizing the search query.

14. The method of claim 1, further comprising, after receiving the search query, hashing the search query.

15. The method of claim 1, wherein generating the list of document identifiers includes transmitting a normalized and hashed representation of the search query to the cache.

16. A server system for searching a document database, comprising:
    one or more processors;
    memory; and
    one or more programs stored in memory, the one or more programs including instructions which, when executed by the one or more processors, cause the system to:
    receive a search query from a client system, the search query containing one or more terms; and
    in response to receiving the search query:
        generate a list of document identifiers including document identifiers for one or more documents retrieved in response to a prior execution of the search query;
        access a cache;
        receive, from the cache, a first set of snippets for a first set of document identifiers, the first set of document identifiers comprising document identifiers in the list for which the cache has current snippets, as determined in accordance with datestamps of the first set of snippets stored in the cache, wherein the retrieved first set of snippets comprise snippets obtained in response to a prior execution of the search query;

generate a second set of snippets for a second set of document identifiers, the second set of document identifiers comprising document identifiers in the list for which the cache does not have current snippets; and transmit, to the client system, search query results comprising information corresponding to at least a portion of the list of document identifiers and corresponding snippets, each corresponding snippet comprising a snippet from the first set of snippets or the second set of snippets.

17. The system of claim 16, wherein a corresponding snippet for a document identifier for a corresponding document is a portion of text from the document that is selected so as to include at least one of the one or more terms in the search query.

18. The system of claim 16, wherein the first set of snippets and the second set of snippets correspond to snippets for a subset of the one or more documents.

19. The system of claim 16, wherein the datestamps of the first set of snippets stored in the cache indicate when a corresponding document from which each snippet of the first set of snippets was obtained was indexed or crawled.

20. The system of claim 16 wherein the instructions to generate a second set of snippets include instructions to update at least one non-current snippet in the cache with a corresponding snippet in the second set of snippets.

21. The system of claim 20, wherein each of the one or more documents are stored in a respective segment of a document database having multiple segments and wherein the instructions to generate the second set of snippets include instructions to generate a current snippet from a current version of a corresponding document, the current version identified based on a current datestamp for the corresponding document, wherein the current datestamp corresponds to a date on which the respective segment of the document database was last indexed or crawled.

22. The system of claim 16, wherein instructions to generate the second set of snippets include instructions to remove one or more corresponding non-current snippets from the cache.

23. The system of claim 16, wherein the at least one non-current snippet is stored in the cache in a block of snippets; and updating the at least one non-current snippet stored in the cache includes updating the block of snippets stored in the cache.

24. A non-transitory computer readable storage medium storing one or more programs configured for execution by one or more processors of a computer system, the one or more programs comprising instructions to be executed by the one or more processors so as to cause the computer system to:

receive a search query from a client system, the search query containing one or more terms; and in response to receiving the search query:
access a cache;

receive, from the cache, a first set of snippets for a first set of document identifiers, the first set of document identifiers comprising document identifiers in the list for which the cache has current snippets, as determined in accordance with datestamps of the first set of snippets stored in the cache, wherein the retrieved first set of snippets comprise snippets obtained in response to a prior execution of the search query;

generate a second set of snippets for a second set of document identifiers, the second set of document identifiers comprising document identifiers in the list for which the cache does not have current snippets; and transmit, to the client system, search query results comprising information corresponding to at least a portion of the list of document identifiers and corresponding snippets, each corresponding snippet comprising a snippet from the first set of snippets or the second set of snippets.

25. The computer readable storage medium of claim 24, wherein a corresponding snippet for a document identifier for a corresponding document is a portion of text from the corresponding document that is selected so as to include at least one of the one or more terms in the search query.

26. The computer readable storage medium of claim 24, wherein the first set of snippets and the second set of snippets correspond to snippets for a subset of the one or more documents.

27. The computer readable storage medium of claim 24, wherein the datestamps of the first set of snippets stored in the cache indicate a document from which each snippet of the first set of snippets was obtained was indexed or crawled.

28. The computer readable storage medium of claim 24, wherein the instructions to generate the second set of snippets include instructions to update at least one non-current snippet in the cache with a corresponding snippet in the second set of snippets.

29. The computer readable storage medium of claim 28, wherein each of the one or more documents are stored in a respective segment of a document database having multiple segments and wherein the instructions to generate the second set of snippets include instructions to generate a current snippet from a current version of a corresponding document, the current version identified based on a current datestamp for the corresponding document, wherein the current datestamp corresponds to a date on which the respective segment of the document database was last indexed or crawled.

30. The computer readable storage medium of claim 28, wherein the at least one non-current snippet is stored in the cache in a block of snippets; and updating the at least one non-current snippet stored in the cache includes updating the block of snippets stored in the cache.

31. The computer readable storage medium of claim 24, wherein instructions to generate the second set of snippets include instructions to remove one or more corresponding non-current snippets from the cache.

* * * * *